P. K. DEDERICK.
BALING-PRESS.
No. 183,547.                               Patented Oct. 24, 1876.
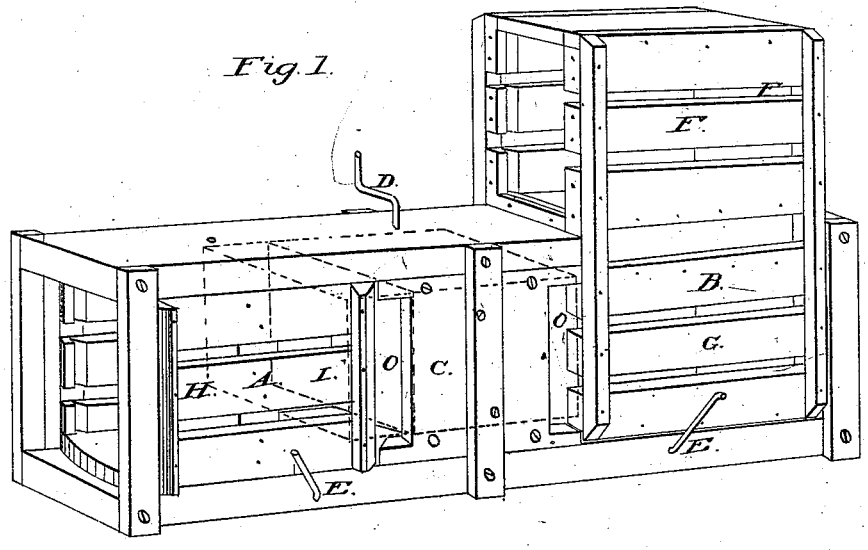
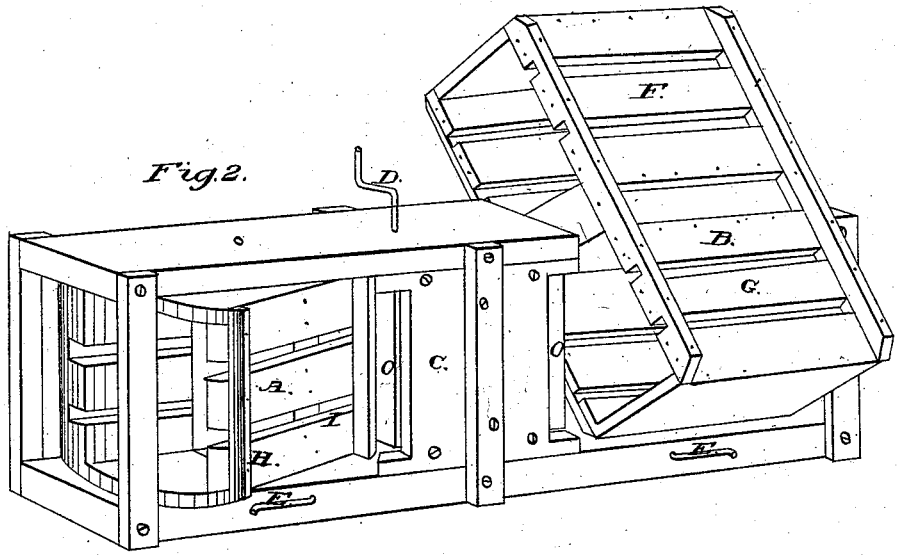
Witnesses:                                              Inventor:

UNITED STATES PATENT OFFICE.

PETER K. DEDERICK, OF ALBANY, NEW YORK.

IMPROVEMENT IN BALING-PRESSES.

Specification forming part of Letters Patent No. 183,547, dated October 24, 1876; application filed August 29, 1876.

*To all whom it may concern:*

Be it known that I, PETER K. DEDERICK, of Albany, in the county of Albany, State of New York, have invented certain Improvements in Baling-Presses, of which the following is a specification:

My invention consists of a novel manner of constructing and operating the press; and in order that the value of my improvements may be appreciated a short explanation may be necessary, as follows: Small bales are rapidly growing into favor, as they are every way more convenient than large ones, and are already more marketable. Now, to make small bales the old forms of box-presses are all too slow to make their use practicable, and something more rapid is necessary. In this case I obtain rapidity by revolving the bale-chamber, thus constructing what I shall designate a "revolver baling-press."

In the drawings, Figure 1 is a perspective view, showing the bale-chambers locked. Fig. 2 is a similar view, but illustrates the bale-chambers in the act of revolving.

Similar letters represent similar parts.

The frame of the press may be constructed as shown, or in any suitable manner. A B are double bale-chambers, having each two separate compartments, to receive the loose material, and provided with tying-slots, as shown. O are feed-orifices, into which the hay is fed. E are clamps or latches, for retaining the chamber in position. The center of the press C is provided with a traverser, o, which may be operated by toggles, or cranks, or eccentric, and either horse or steam power applied.

In operation the loose material is passed in through the opening at O, and the stroke of the traverser presses it into chambers I and G, and the operation is continued until the chambers are filled with pressed material, thus forming a bale in each chamber I and G.

The chambers are now revolved or moved on their axis, as shown in Fig. 2, thus bringing the chambers H and F in position to receive the material, while the filled chambers are tied off through the tying-slots, and the bale removed.

The operation is thus continued, and really making it almost a continuous baling-press, as no delay in feeding is necessary, except the time required to revolve the chambers.

I have illustrated and described my press as a double machine, but it may be constructed single, or with only revolving chambers at one end, and the number of compartments to the chamber may also be varied to suit.

Having thus fully described my improved press, I claim, and desire to secure by Letters Patent, as follows:

In that class of presses into which the hay is fed and pressed by a reciprocating traverser, either jointly or separately, the revolving bale-chambers A and B, each having two or more compartments, in combination with the reciprocating traverser, substantially as set forth.

PETER K. DEDERICK.

Witnesses:
W. A. SKINKLE,
R. J. VAN SCHOONHOVEN.